United States Patent
Liu et al.

(10) Patent No.: US 9,541,957 B1
(45) Date of Patent: Jan. 10, 2017

(54) ADJUSTABLE ELECTRONIC DEVICE STAND

(71) Applicant: DATAVAN INTERNATIONAL CORP., New Taipei (TW)

(72) Inventors: Hsien-Tang Liu, New Taipei (TW); Kang Ku, New Taipei (TW); Chun-Yi Lee, New Taipei (TW)

(73) Assignee: DATAVAN INTERNATIONAL CORP., New Taipei (TW)

( * ) Notice: Subject to any disclaimer, the term of this patent is extended or adjusted under 35 U.S.C. 154(b) by 0 days.

(21) Appl. No.: 14/947,282

(22) Filed: Nov. 20, 2015

(51) Int. Cl.
| | | |
|---|---|---|
| *G06F 1/16* | (2006.01) | |
| *F16M 11/04* | (2006.01) | |
| *F16M 11/12* | (2006.01) | |
| *F16M 11/22* | (2006.01) | |

(52) U.S. Cl.
CPC .......... *G06F 1/1632* (2013.01); *F16M 11/041* (2013.01); *F16M 11/126* (2013.01); *F16M 11/22* (2013.01); *G06F 1/1679* (2013.01); *G06F 1/1698* (2013.01); *F16M 2200/08* (2013.01)

(58) Field of Classification Search
CPC .... G06F 1/1632; G06F 1/1683; G06F 1/1616; G06F 1/1626; G06F 1/166; G06F 1/1679; G06F 1/1698; F16M 13/00; F16M 11/041; F16M 11/10; F16M 11/105; F16M 11/2021; F16M 11/38; F16M 13/02; F16M 13/022; F16M 13/04; F16M 11/126; F16M 11/22; F16M 2200/08; H05K 7/14

USPC .......... 361/679.01, 679.02, 679.41, 679.43, 361/679.26, 679.27, 679.22, 361/679.55–679.58; 248/917–924; 710/303–305
See application file for complete search history.

(56) References Cited

U.S. PATENT DOCUMENTS

| | | | | |
|---|---|---|---|---|
| 7,178,771 B2* | 2/2007 | Richter | ................... | B60R 11/02 248/205.5 |
| 8,979,040 B2* | 3/2015 | Chien | ................... | F16M 13/00 248/121 |

\* cited by examiner

*Primary Examiner* — Anthony Haughton
*Assistant Examiner* — Ingrid Wright
(74) *Attorney, Agent, or Firm* — Muncy, Geissler, Olds & Lowe, P.C.

(57) ABSTRACT

Adjustable electronic device stand includes a base member defining therein a circular accommodation recess, an adjustment mechanism including an axial rotary table, a rotating component set consisting of a stub rod member, a driving plate, a rotating plate and a position-limit plate for rotatably securing the axial rotary table to the base member and a longitudinal adjustment unit pivotally coupled with a first pivot at one side thereof to the axial rotary table, and an electronic device holder including a mating connection member pivotally coupled to a second pivot at an opposite side of the longitudinal adjustment unit, a supporting platform for holding an electronic device, an electrical connector for the connection of an electrical connector of the loaded electronic device and a retractable clamp for clamping on the loaded electronic device.

7 Claims, 8 Drawing Sheets

ADJUSTABLE ELECTRONIC DEVICE STAND

BACKGROUND OF THE INVENTION

1. Field of the Invention

The present invention relates to electronic device stand technology, and more particularly to an adjustable electronic device stand, which allows adjustment of the elevation, angular position and tilting angle of the loaded electronic device.

2. Description of the Related Art

With the innovation and evolution of the economic and financial system, the mode of consumer transaction has changed under the application of modern technological devices. In early days, when purchased certain items from a traditional market, grocery store or street vendor, consumers didn't understand the details and amount of the consumed items before purchase and simply paid the total amount after settlement by the vendor. With the advent of the electronic age of technology, large shopping malls, supermarkets, department stores, convenience stores and entertainment ticket vendors entered the consumer market. After purchase, the related personnel or clerks will issue receipts or uniform invoices to the consumers so that the consumers can check the consumed items and amounts, and thus, the number of consumer disputes cases is gradually reduced in recent years. However, with the rise of environmental awareness in recent years, the government actively promotes electronic invoicing activities so as to reduce paper usage. These electronic invoices simply record the amount of consumption without listing the quantity and price of the consumed items. If an electronic invoice is stored in an electronic card, the consumer cannot see the consumed amount or item. Further, many people often need to go to financial institutions (such as banks or post offices, etc.) for storing cashes, withdrawing money or transferring money. After processed through a computer by a bank clerk, people cannot know the detailed of the transaction items, and can simply learn increasing or decreasing of money in the account through the paper document or deposit book. Further, the display screens of all kinds of electronic cash registers, ticket machines or computer systems are commonly disposed to face toward the workers, and the displayed contents such as transacted items, unit prices, quantity, total price, etc. are not easily visible by the consumer or payer, and the consumer or payer cannot grasp the actual content of consumption.

Further, for the advantage of convenient application of electronic technology products, many caterers and food service companies use electronic cash registers, ordering machines and/or tablets for serving consumers. After a consumer ordered a food, meal or beverage, the food, meal or beverage can be quickly prepared in the internal kitchen, significantly reducing the waiting time. However, the content displayed on the display screen of an electronic cash register, ordering machine or tablet cannot be provided for viewing by the consumers, and the consumers cannot easily understand the details of the consumption when paying for the bill.

Therefore, it is desirable to provide a measure that can resolve the problem that the consumer cannot easily know the items, quantity, unit price, total price and other related details during consumption, avoiding consumer disputes.

SUMMARY OF THE INVENTION

The present invention has been accomplished under the circumstances in view. It is therefore the main object of the present invention to provide an adjustable electronic device stand, which allows adjustment of the elevation, angular position and tilting angle of the loaded electronic device conveniently and positively.

To achieve this and other objects of the present invention, an adjustable electronic device stand comprises a base member, an adjustment mechanism, and an electronic device holder. The base member defines therein a circular accommodation recess. The adjustment mechanism comprises an axial rotary table, a rotating component set consisting of a stub rod member, a driving plate, a rotating plate and a position-limit plate for rotatably securing the axial rotary table to the base member, and a longitudinal adjustment unit pivotally coupled with a first pivot at one side thereof to the axial rotary table. The electronic device holder comprises a mating connection member pivotally coupled to a second pivot at an opposite side of the longitudinal adjustment unit, a supporting platform for holding an electronic device, an electrical connector for the connection of an electrical connector of the loaded electronic device, and a retractable clamp for clamping on the loaded electronic device. Thus, the loaded electronic device can be rotated with the electronic device holder and the axial rotary table of the adjustment mechanism horizontally relative to the base member, and lifted and tilted relative to the base member subject to the functioning of the rotating component set and the longitudinal adjustment unit, enabling people standing around the base member at any angle to see the displayed content of the electronic device clearly.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
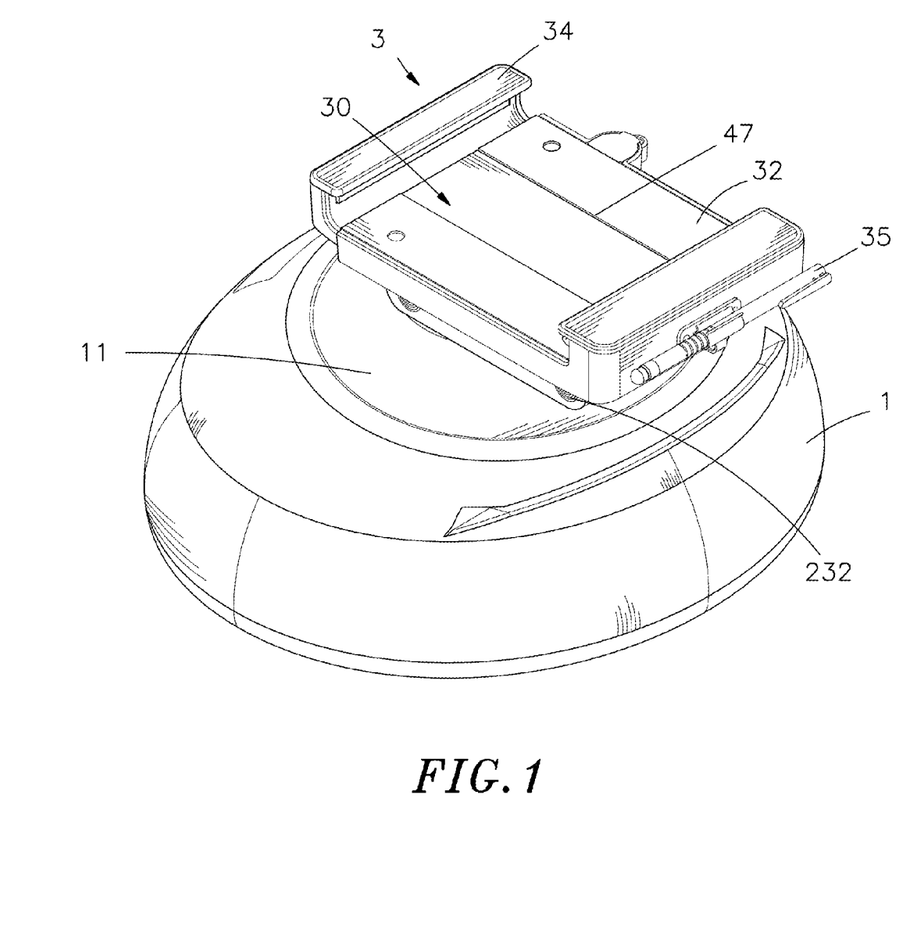
FIG. 1 is an oblique top elevational view of an adjustable electronic device stand in accordance with the present invention.
Figure 2:
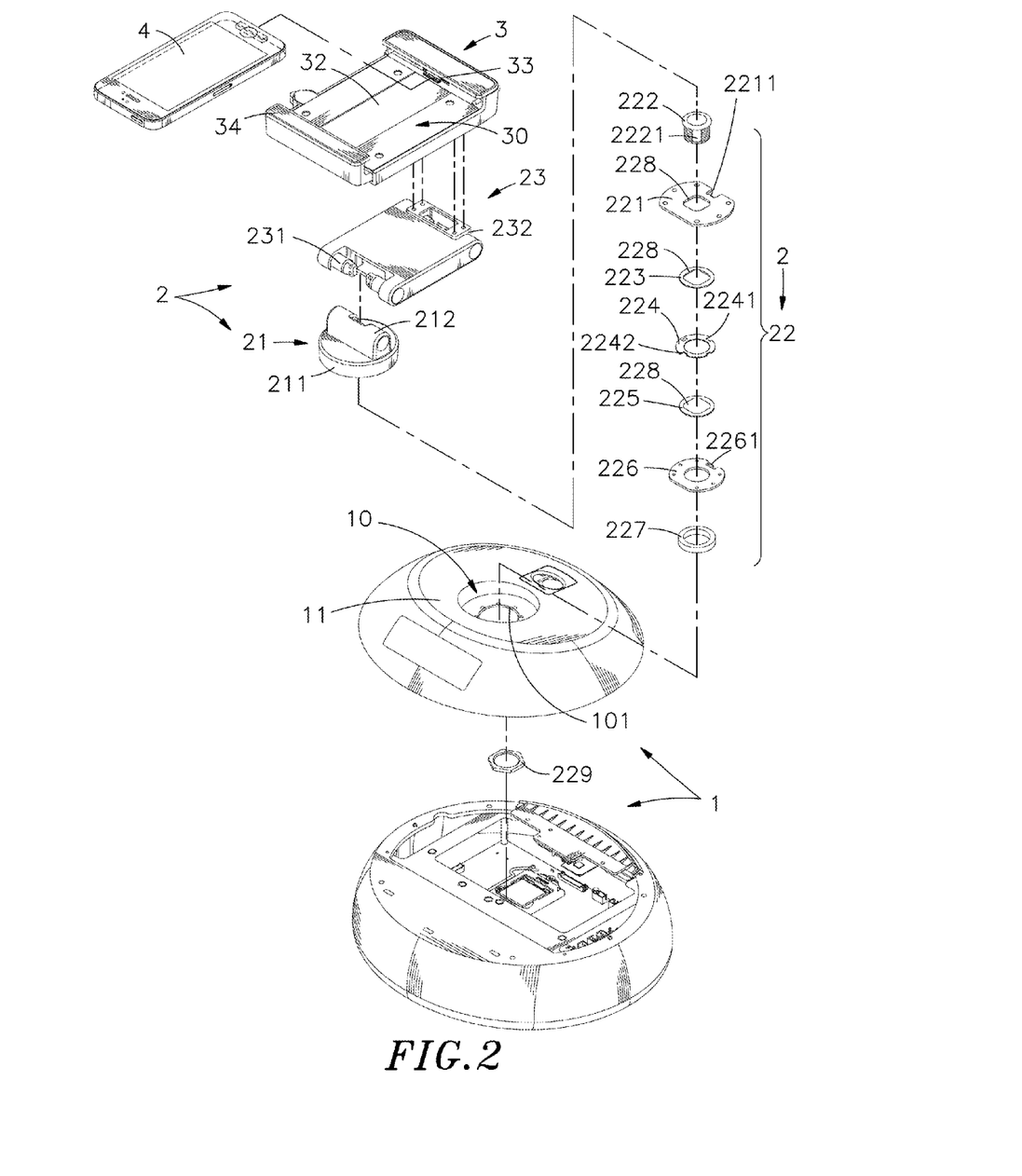
FIG. 2 is an exploded view of the adjustable electronic device stand in accordance with the present invention.
Figure 3:
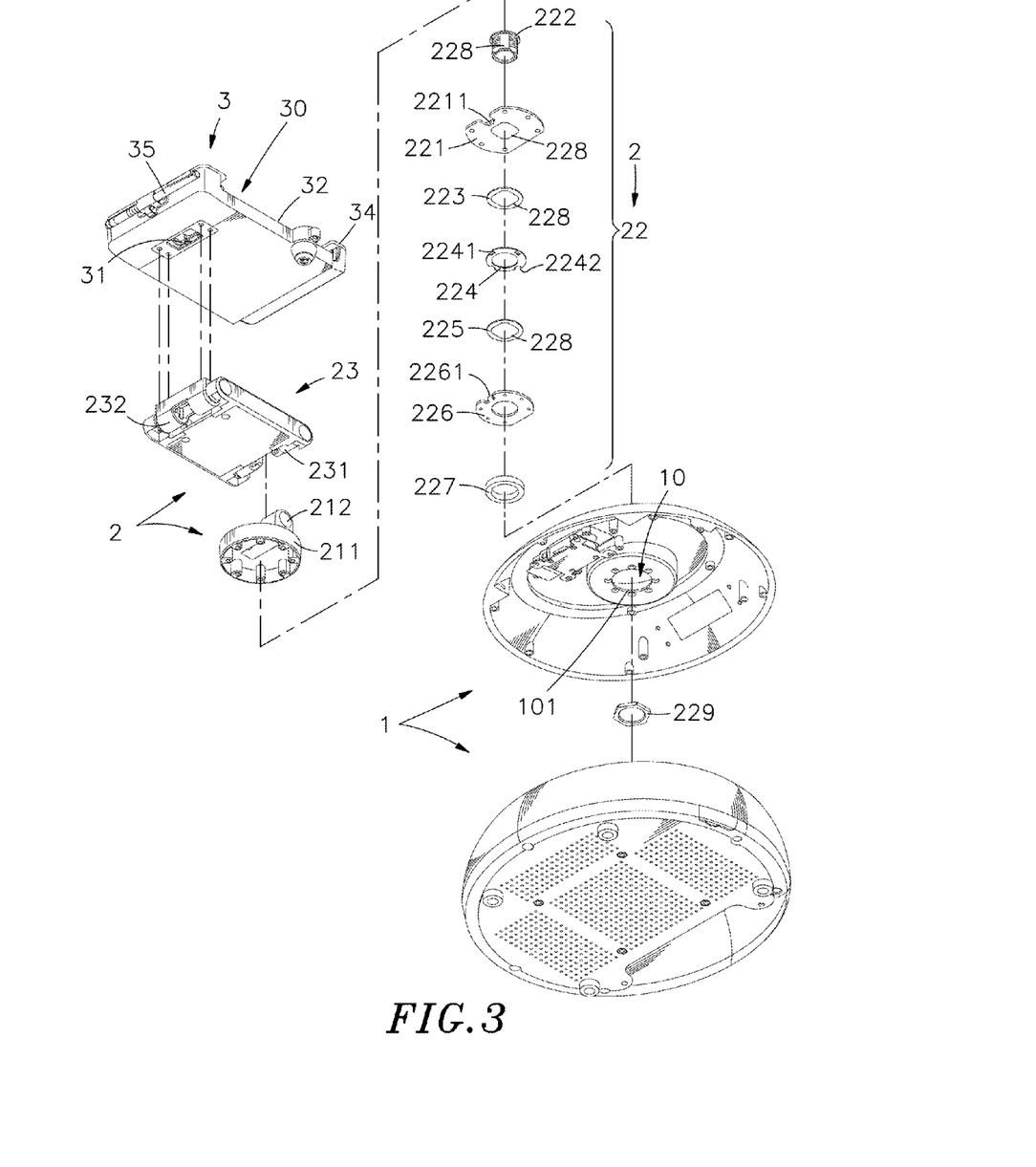
FIG. 3 corresponds to FIG. 2 when viewed from another angle.
Figure 4:
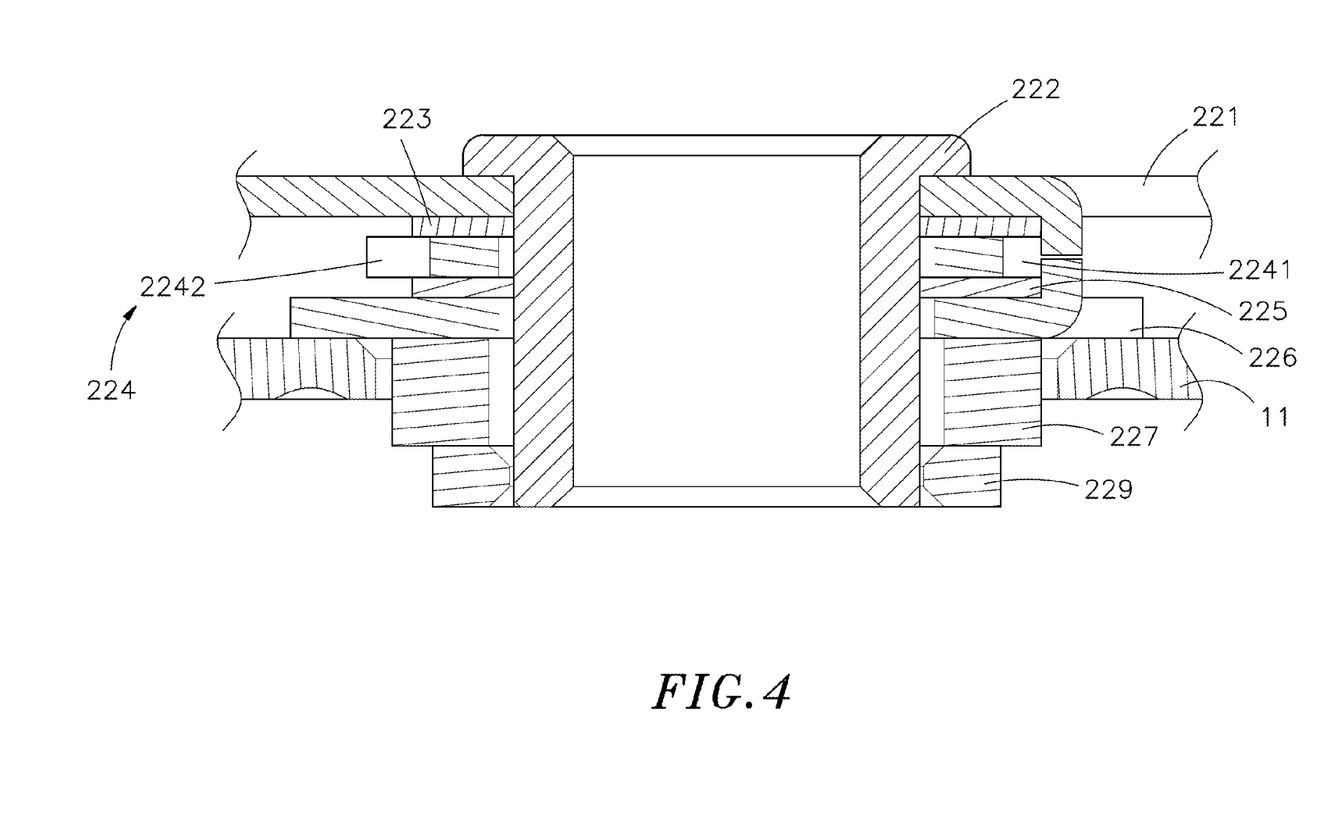
FIG. 4 is a sectional side view of the rotating component set of the adjustable electronic device stand in accordance with the present invention.

Referring to FIGS. 1-4, an adjustable electronic device stand in accordance with the present invention is shown. The adjustable electronic device stand comprises a base member 1, an adjustment mechanism 2 and an electronic device holder 3.

The base member 1 comprises a sloping top wall 11 located on a top side thereof, a circular accommodation recess 10 located in the sloping top wall 11, and a through hole 101 located in the circular accommodation recess 10.

The adjustment mechanism 2 comprises an axial rotary table 21, a rotating component set 22 and a longitudinal adjustment unit 23. The axial rotary table 21 comprises a circular table body 211 mounted in the circular accommodation recess 10 of the base member 1, and a connection shaft 212 located at a top side of the circular table body 211 and exposed outside the circular accommodation recess 10. The rotating component set 22 comprises a stub rod member 222, which can be, for example, a stub screw rod affixed to a bottom wall of the circular table body 211 and having a cut plane 2221 located on the periphery thereof, a driving plate 221 fixedly mounted around a top end of the stub rod member 222 adjacent to the circular table body 211 and providing a first lug 2211 horizontally disposed at one lateral side thereof, an upper cushion pad 223 and a lower cushion pad 225 mounted around the stub rod member 222 at different elevations beneath the driving plate 221, a rotating plate 224 mounted around the stub rod member 222 and set between the upper cushion pad 223 and the lower cushion pad 225 and having two bearing edges 2241, 2242 horizontally spaced from each other at an angle of 180 degrees, a liner gasket 227 mounted around the stub rod member 222 near an opposing bottom end thereof, a position-limit plate 226 mounted around the stub rod member 222 and set between the lower cushion pad 225 and the liner gasket 227 and having a second lug 2261 horizontally disposed at one lateral side thereof, and a lock member 229 (for example, locknut) fastened to the bottom end of the stub rod member 222 and stopped against a bottom side of the liner gasket 227 opposite to the position-limit plate 226. After installation of the rotating component set 22, the first lug 2211 is horizontally disposed beyond the peripheral edge of the position-limit plate 226. Further, the bearing edges 2241, 2242 of the rotating plate 224 between the driving plate 221 and the position-limit plate 226 are adapted for stopping against the first lug 2211 or the second lug 2261. Further, the first lug 2211 and the second lug 2261 are kept apart from each other at a certain distance, avoiding direct contact. Further, the position-limit plate 226, the upper cushion pad 223 and the lower cushion pad 225 each provide at least one engagement edge 228 for engagement with the cut plane 2221 of the stub rod member 222. Further, the bottom end of the stub rod member 222 is downwardly extended out of the liner gasket 227 and inserted through the through hole 101 in the circular accommodation recess 10 and fastened up with the lock member 229 (for example, locknut) for allowing rotation of the circular table body 211 relative to the base member 1. Further, the longitudinal adjustment unit 23 comprises a first pivot 231 located at one side thereof and pivotally coupled to the connection shaft 212 of the circular table body 211, and a second pivot 232 located at an opposite side thereof.

The electronic device holder 3 comprises a mating connection member 31 located at a bottom side thereof and pivotally coupled to the second pivot 232 of the longitudinal adjustment unit 23, a supporting platform 32 located at an opposing top side thereof, a signal connector, for example, electrical connector 33 located at one side of the supporting platform 32, a retractable clamp 34 located at an opposite side of the supporting platform 32, and a clamping space 30 defined between the electrical connector 33 and the retractable clamp 34 within the supporting platform 32.

Figure 5:
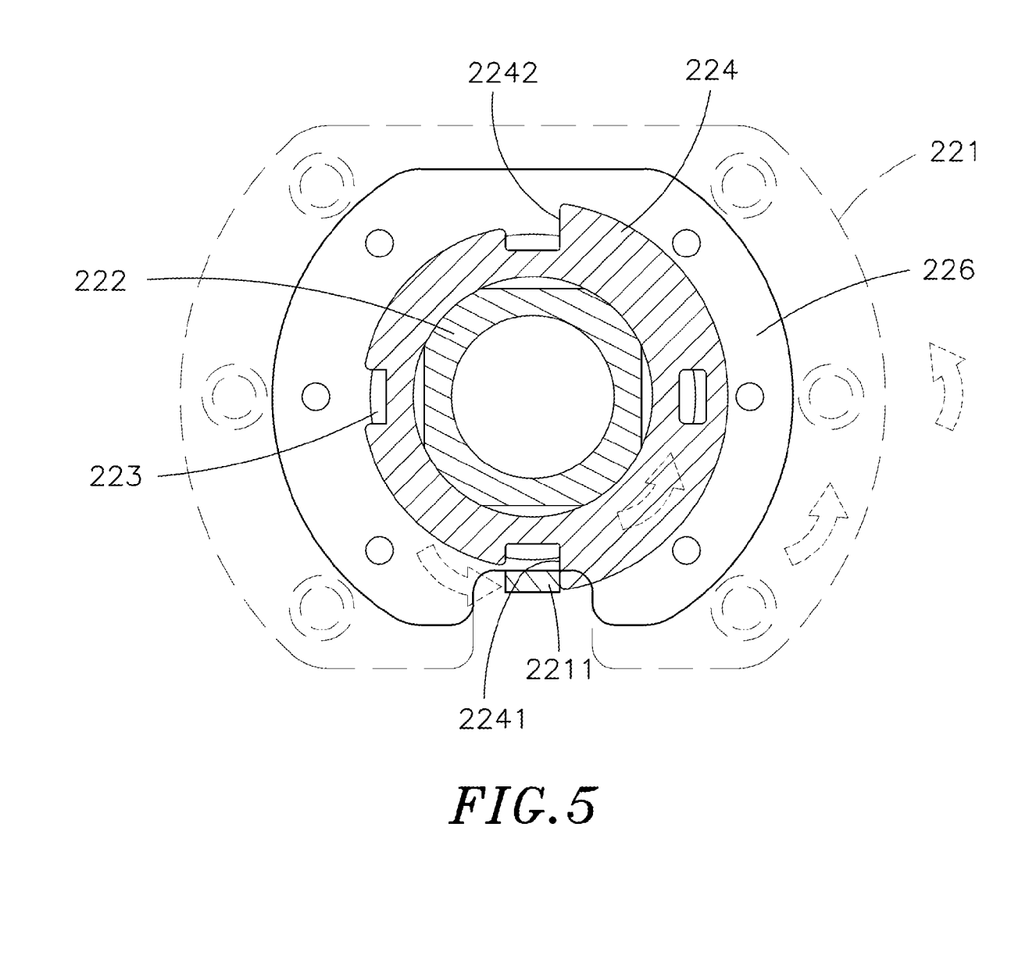
FIG. 5 is a schematic sectional top view of the rotating component set of the adjustable electronic device stand in accordance with the present invention.
Figure 6:
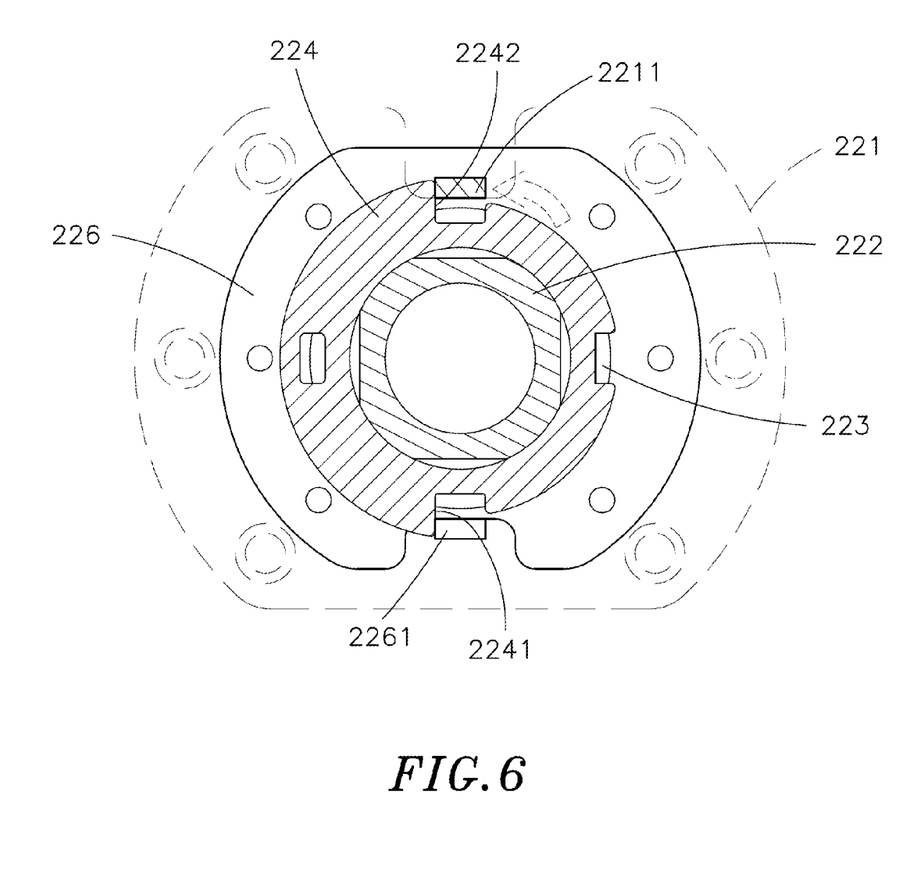
FIG. 6 is a schematic sectional top view of a part of the present invention, illustrating the stub rod member rotated in one direction.
Figure 7:
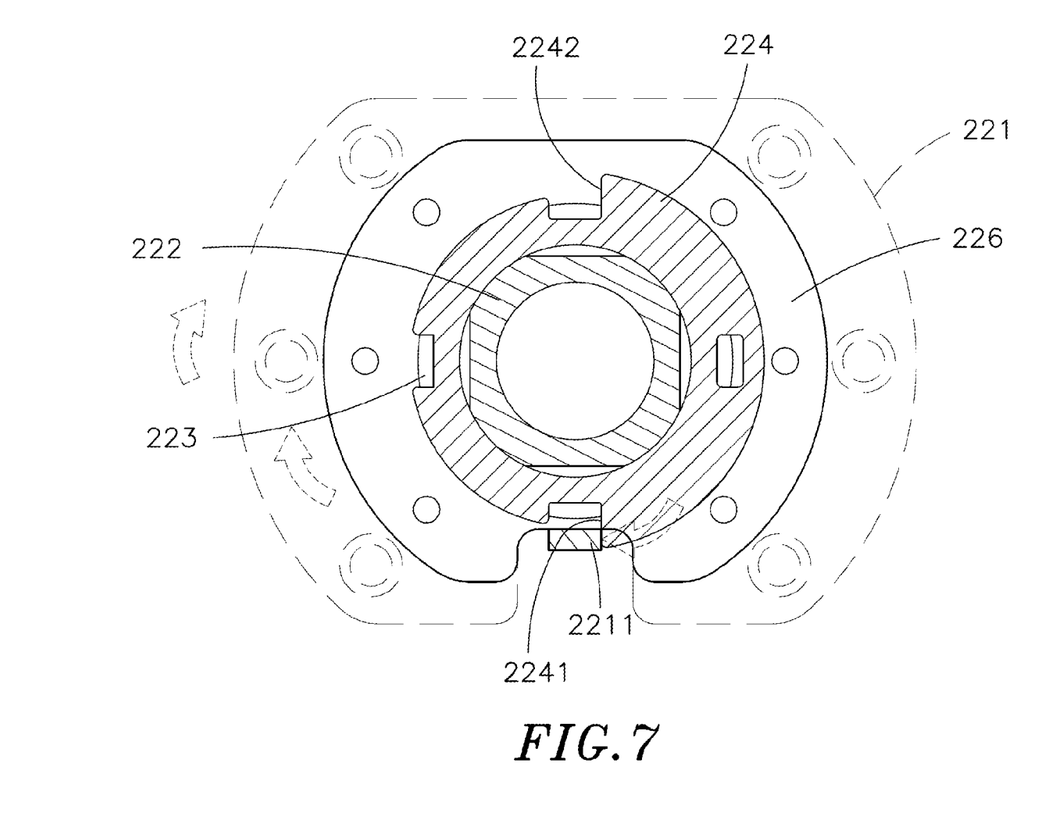
FIG. 7 is a schematic sectional top view of a part of the present invention, illustrating the stub rod member rotated in the reversed direction (I).
Figure 8:
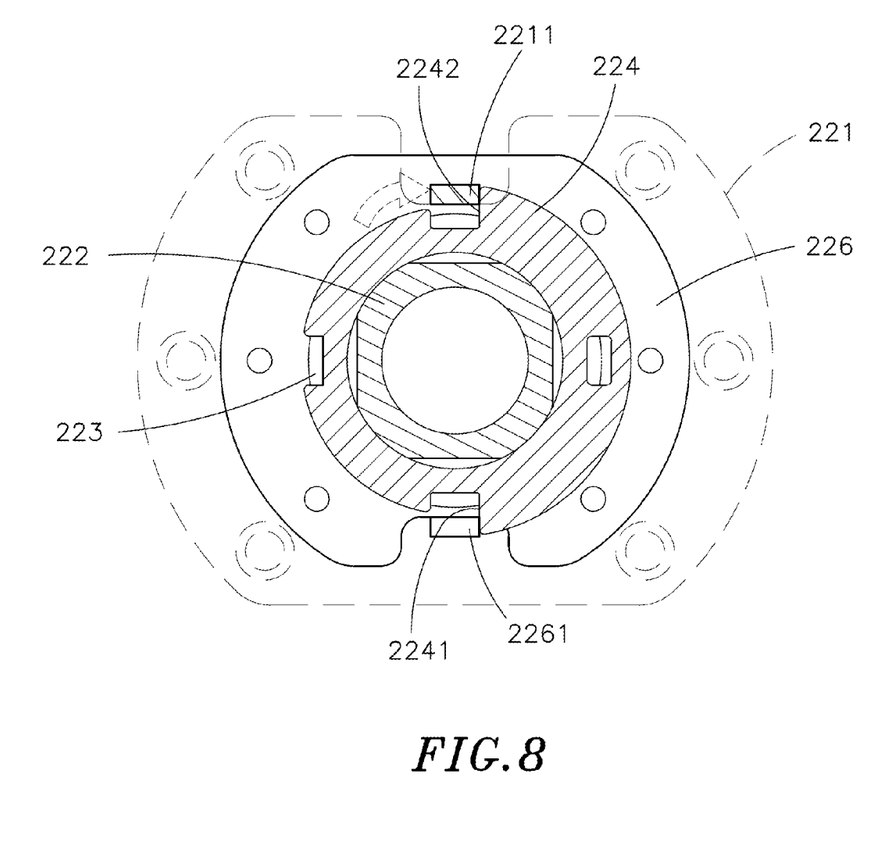
FIG. 8 is a schematic sectional top view of a part of the present invention, illustrating the stub rod member rotated in the reversed direction (II).

Referring to FIGS. 5-8 and FIGS. 2 and 4 again, in application of the adjustable electronic device stand, an electronic device 4 (such as tablet computer, smart phone, PDA or LCD display device) can be set in the clamping space 30 above the supporting platform 32 of the electronic device holder 3 with an electrical connector (not shown) at one side of the electronic device 4 electrically connected to the electrical connector 33 (electrical signal connector, power connector, etc.) at one sided of the supporting platform 32 and then the retractable clamp 34 is adjusted to clamp on one side of the electronic device 4, holding the electronic device 4 firmly on the supporting platform 32 within the clamping space 30. At this time, the electronic device holder 3 can be rotated with the axial rotary table 21 of the adjustment mechanism 2 in the circular accommodation recess 10 of the base member 1 in one direction. When rotating the axial rotary table 21, the stub rod member 222 of the rotating component set 22 is rotated with the table body 211 to force the cut plane 2221 against the engagement edges 228 of the driving plate 221, the upper cushion pad 223 and the lower cushion pad 225, causing the first lug 2211 of the driving plate 221 to move the bearing edge 2241 of the rotating plate 224, and therefore, the rotating plate 224 is rotated with the driving plate 221, the stub rod member 222 and the axial rotary table 21, and, the other bearing edge 2242 of the rotating plate 224 can then be moved to abut against the second lug 2261 of the position-limit plate 226, and thus, the electronic device holder 3 can be rotated within an angle of 180 degrees relative to the base member 1.

The electronic device holder 3 and the adjustment mechanism 2 can be rotated relative to the base member 1 in the revered direction. At this time, the stub rod member 221 of the rotating component set 22 is rotated with the circular table body 211 of the axial rotary table 21 to move the driving plate 221 from one bearing edge 2241 of the rotating plate 224 to the other bearing edge 2242 without causing rotation of the rotating plate 224 with the driving plate 221, and thus, the electronic device holder 3 with the electronic device 4 can be rotated through an angle of 180 degrees in the reversed direction relative to the base member 1. By means of the longitudinal adjustment unit 23 of the adjustment mechanism 2, the elevation and tilting angle of the electronic device holder 3 can be adjusted, allowing people standing at two opposite lateral sides relative to the base member 1 can see the displayed content of the electronic device 4 clearly. Further, a stylus 35 is detachably attached to one lateral side of the electronic device holder 3 adjacent to the electrical connector 33 for use to click the screen of the electronic device 4.

Further, by means of moving the retractable clamp 34 outwardly relative to the electronic device 4, the electronic device 4 is released from the constraint and can be taken out of the clamping space 30 of the electronic device holder 3. After the user took the electronic device 4 out of the clamping space 30 of the electronic device holder 3, the user can operate the electronic device 4 for food ordering, product presentation, promotion, or introduction to general business operations or business rules). After each use, the electronic device 4 is set in the clamping space 30 of the electronic device holder 3 to let the electrical connector of the electronic device 4 be electrically connected to the electrical connector 33 again, and then the retractable clamp 34 is adjusted to clamp on one side of the electronic device 4, holding the electronic device 4 firmly in the electronic device holder 3, and allowing the elevation and angular position of the electronic device 4 and the electronic device holder 3 to be adjusted by means of the adjustment mechanism 2 relative to the base member 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable electronic device stand, comprising:
a base member comprising a circular accommodation recess located in a top side thereof;
an adjustment mechanism comprising an axial rotary table, a rotating component set and a longitudinal adjustment unit, said axial rotary table comprising a circular table body rotatably mounted in said circular accommodation recess of said base member and a connection shaft located at a top side of said circular table body, said rotating component set comprising a stub rod member affixed to said circular table body and rotatably coupled to said base member and a driving plate, a rotating plate and a position-limit plate mounted on said stub rod member at different elevations for enabling said stub rod member to be rotated with said circular table body relative to said base member by an external force and then positioned in a selected position after disappear of said external force, said longitudinal adjustment unit comprising a first pivot located at one lateral side thereof and pivotally coupled to said connection shaft and a second pivot located at an opposite lateral side thereof; and
an electronic device holder mounted on said longitudinal adjustment unit, said electronic device holder comprising a mating connection member located at a bottom side thereof and pivotally coupled to said second pivot of said longitudinal adjustment unit, a supporting platform located at an opposing top side thereof for supporting an electronic device, a signal connector located at one side of said supporting platform for the connection of an electrical connector of the electronic device that is supported on said supporting platform, and a retractable clamp located at an opposite side of said supporting platform for clamping on one side of the electronic device that is supported on said supporting platform.

2. The adjustable electronic device stand as claimed in claim 1, wherein said base member comprises a sloping top wall; said circular accommodation recess is located in said sloping top wall; said circular table body of said axial rotary is a circular member rotatably mounted in said circular accommodation recess.

3. The adjustable electronic device stand as claimed in claim 1, wherein said base member further comprises a through hole located in said circular accommodation recess; said stub rod member of said rotating component set of said adjustment mechanism is inserted through and rotatably coupled to said through hole of said base member.

4. The adjustable electronic device stand as claimed in claim 1, wherein said rotating component set of said adjustment mechanism further comprises an upper cushion pad mounted around said stub rod member between said driving plate and said rotating plate, a lower cushion pad mounted around said stub rod member between said rotating plate and said position-limit plate, a liner gasket mounted around said stub rod member beneath said position-limit plate, and a lock member fastened to said stub rod member and stopped against a bottom side of said liner gasket opposite to said position-limit plate.

5. The adjustable electronic device stand as claimed in claim 4, wherein said stub rod member is a screw rod; said lock member is a locknut threaded onto said stub rod member.

6. The adjustable electronic device stand as claimed in claim 1, wherein said signal connector of said electronic device holder at one side of said supporting platform is an electrical connector for the transmission of electrical signal and/or electrical power; said electronic device is a smart phone, tablet computer, PDA or any other electronic device having a display screen.

7. The adjustable electronic device stand as claimed in claim 1, wherein said electronic device holder comprises a retractable clamp located at an opposite side of said platform, and a clamping space defined between said electrical connector and said retractable clamp within said supporting platform for holding said electronic device.

* * * * *